United States Patent
Heckel et al.

(10) Patent No.: US 8,622,662 B2
(45) Date of Patent: Jan. 7, 2014

(54) TOOL HAVING DETACHABLY CLAMPED CUTTING BODY

(75) Inventors: Gerd Heckel, Puschendorf (DE); Hans-Peter Hollfelder, Fürth (DE)

(73) Assignee: Guehring OHG, Albstadt (DE)

( * ) Notice: Subject to any disclaimer, the term of this patent is extended or adjusted under 35 U.S.C. 154(b) by 68 days.

(21) Appl. No.: 13/168,380

(22) Filed: Jun. 24, 2011

(65) Prior Publication Data
US 2012/0070241 A1 Mar. 22, 2012

Related U.S. Application Data

(63) Continuation of application No. PCT/DE2009/001790, filed on Dec. 21, 2009.

(30) Foreign Application Priority Data

Dec. 24, 2008 (DE) .................. 10 2008 063 127

(51) Int. Cl.
*B23B 27/16* (2006.01)

(52) U.S. Cl.
USPC .............................. 407/40; 407/50; 407/110

(58) Field of Classification Search
USPC ........ 407/40, 47, 50, 109, 110; 408/231, 233, 408/713
See application file for complete search history.

(56) References Cited

U.S. PATENT DOCUMENTS

| | | | |
|---|---|---|---|
| 3,205,559 A * | 9/1965 | Greenleaf ........................ | 407/36 |
| 4,230,427 A * | 10/1980 | Belttari et al. .................. | 407/91 |
| 4,462,725 A * | 7/1984 | Satran et al. .................... | 407/92 |
| 4,611,516 A * | 9/1986 | Hochmuth et al. .............. | 82/1.2 |
| 5,035,545 A | 7/1991 | Zinner | |
| 5,211,516 A * | 5/1993 | Kress et al. .................... | 408/231 |
| 5,391,023 A * | 2/1995 | Basteck ....................... | 408/146 |
| 5,888,028 A * | 3/1999 | Grainger et al. .............. | 407/110 |
| 6,558,087 B1 * | 5/2003 | Hollfelder ..................... | 407/107 |
| 6,579,044 B1 | 6/2003 | Trenkwalder et al. | |
| 6,880,832 B2 * | 4/2005 | DeRosa .......................... | 279/44 |
| 2003/0053872 A1 | 3/2003 | Schlagenhauf | |
| 2005/0254907 A1 * | 11/2005 | Bader et al. ..................... | 407/36 |

FOREIGN PATENT DOCUMENTS

| | | | |
|---|---|---|---|
| DE | 4024096 A * | 2/1992 | |
| DE | 42 36 370 | 5/1994 | |
| EP | 0 385 495 | 9/1990 | |
| EP | 1 293 280 | 3/2003 | |
| RU | 1704940 A1 * | 1/1992 | |
| SU | 1256864 A * | 9/1986 | |
| SU | 1509188 A * | 9/1989 | |

* cited by examiner

*Primary Examiner* — Daniel Howell
*Assistant Examiner* — Nicole N Ramos
(74) *Attorney, Agent, or Firm* — Burr & Brown, PLLC

(57) ABSTRACT

The invention relates to a tool, in particular a revolving tool for machining, in particular metal cutting, workpieces, comprising a carrier body, a cutting body arranged detachably on the carrier body, and a clamping bracket for the positionally accurate fixation of the cutting body relative to the carrier body, wherein the cutting body is pressed against a supporting surface on the carrier body in a planar manner. According to the invention, the clamping bracket is integral with the carrier body and connected to the carrier body by way of a material joint. Furthermore, the cutting body is supported in the direction of the material joint on a face supporting surface of the clamping bracket, wherein the supporting surface is arranged on the carrier body at an acute angle ($\alpha$) with respect to the face supporting surface of the clamping bracket and oriented in the direction of the material joint.

16 Claims, 5 Drawing Sheets

TOOL HAVING DETACHABLY CLAMPED CUTTING BODY

In some embodiments in accordance with the present invention, there is provided a rotary tool for machining, and further in particular, material-removing machining, of workpieces, comprising a carrier body, a cutting body detachably arranged on the carrier body and a clamping claw for fixing the cutting body relative to the carrier body, the cutting body being, pressed against a supporting surface on the carrier body.

Tools provided with cutting inserts, for example indexable cutting inserts, are generally used when functional surfaces have to be machined with the greatest possible precision and at the same time when the useful life of the tool has to be kept as long as possible in order to keep the cost-effectiveness of the relatively expensive tool to a level which is as great as possible. Different approaches are known for designing such tools.

Thus, for example, a tool is disclosed in DE 3037576 A1 in which for fixing a cutting body, in particular an indexable cutting insert, a clamping claw is used which is pressed by means of a clamping screw against a carrier body, and thus with a protruding end portion presses against the cutting body, which as a result is pressed against a first supporting surface on the carrier body in a planar manner. The supporting surface on the carrier body is at an acute angle to a second supporting surface on the carrier body, whereby when the clamping claw is clamped the cutting body is subjected to a force component in the direction of the second supporting surface on the carrier body. The position of the cutting body relative to the carrier body is determined by a third supporting surface, also configured on the carrier body in a direction parallel to the two supporting surfaces. The position of the cutting body relative to the carrier body is thus clearly predetermined by three supporting surfaces on the carrier body. Fine adjustment of the cutting body, for example in a radial direction, is not provided.

Rotation of the clamping claw when screwing in the clamping screw, is intended to be achieved by anti-rotational locking in the form of a pin fastened in the carrier body, which engages in a corresponding groove on the clamping claw. At the same time, the pin has to be guided with a lateral clearance—albeit minimal—in the groove of the clamping claw, in order to permit a relative movement between the clamping claw and the anti-rotating locking pin when screwing in the clamping screw. Rotation of the clamping claw and thus slipping of the cutting body relative to the carrier body, therefore, may not be entirely excluded.

EP 1293280 B1 shows and discloses a tool in which a cutting body is also pressed by means of a clamping claw against a supporting surface on a carrier body in a planar manner. In contrast to DE 3037576 A1 the cutting body is received in a pocket in the clamping claw and the clamping claw is able to be positioned accurately relative to the carrier body with the cutting body received in the pocket.

As already mentioned in the introduction, generic tools are used when functional surfaces are intended to be machined cost-effectively with a high level of quality and tight tolerance settings. In order to keep the adjustment times of the tool and/or the resetting time as short as possible, the requirement is set for such a tool to be able to undertake within the shortest time an accurate adjustment of the functional cutting edge(s) of the cutting body relative to the carrier body, for example to the rotational axis of the carrier body and/or to a further tool carried by the carrier body. It is, therefore, important to configure the tool so that the cutting body, in particular in the form of an indexable cutting insert, is not only supported in a stable manner by the carrier body but also may be finely adjusted and tightly clamped even with simple hand movements and rapidly after basic positioning has been carried out.

The object of the invention is to develop a tool of the type described in the introduction so that it is possible by means of a simple construction to fix a cutting body, in particular, an indexable cutting insert according to DIN, always in an accurate position and in a stable manner on the carrier body.

This object is achieved by a tool having a carrier body, a cutting body detachably arranged on the carrier body, and a clamping claw for fixing the cutting body relative to the carrier body, the cutting body being pressed against a supporting surface on the carrier body, the clamping claw integral with the carrier body via a material joint, and the cutting body supported on a front supporting surface of the clamping claw, the supporting surface located on the carrier body at an acute angle relative to the front supporting surface of the clamping claw, the front supporting surface facing towards the material joint. Advantageous developments of the invention form the subject-matter of the dependent claims.

In the tool according to the invention, the clamping claw is configured integrally with the carrier body and is connected to the carrier body via a material joint. The clamping claw is thus made out of the tool and/or carrier body blank. Due to the fixed connection to the carrier body of the clamping claw protruding towards the cutting body, an undesirable movement of the clamping claw relative to the carrier body is eliminated via the material joint. Thus an undesirable relative movement of the clamping claw when clamping said clamping claw against the cutting body is excluded from the start. Due to the fixed connection of the clamping claw to the carrier body, moreover, the number of components may be restricted to a minimum, whereby the flux of force from the functional cutting edge(s) of the cutting body to the carrier body is optimized. As the clamping claw is configured integrally with the carrier body, little constructional space is required, so that the clamping principle according to the invention may be used for all types of tools, i.e. even for tools with small operating diameters, and tool materials. As the cutting body, which may be produced in a similar manner to the carrier body from any available workpieces, is not fastened directly to the carrier body but via the clamping claw, even the smallest cutting body may be used, which would otherwise be too weakened by a central through-hole for receiving a clamping screw, for example. The cutting body, therefore, is able to bear against a large surface area of the carrier body.

According to the invention, the clamping claw has on its protruding end portion a front supporting surface which supports the cutting body in the direction of the material joint. The supporting surface defined on the carrier body protrudes at an acute angle (for example between 75° and 85°, preferably approximately 80°) relative to the front supporting surface defined on the clamping claw and faces towards the material joint. The acute angle between the supporting surface facing the material joint on the carrier body and the front supporting surface on the clamping claw ensures that the cutting body, when clamped against the supporting surface on the carrier body, is subjected at the same time to a force component in a direction towards the material joint. Advantageously, this direction opposes the feed direction of the tool, and thus corresponds in drilling, countersinking or reaming tools to the axial direction, and in milling tools to the axial or radial direction, depending on the design. Both the front supporting surface on the clamping claw and the supporting surface located at an acute angle thereto on the carrier body are preferably aligned parallel to the "joint axis" of the material joint. In any case, by the construction according to the invention a clearly defined and thus reliable and stable support of the cutting body, both on the supporting surface defined on the carrier body and the front supporting surface defined on the clamping claw, is ensured.

A further support of the cutting body in a direction parallel to the supporting surface defined on the carrier body and the front supporting surface defined on the clamping claw is preferably not carried out by an additional supporting surface rigidly provided on the carrier body, but by an adjustment element received in the carrier body, which ensures fine adjustment of the cutting body in a direction parallel to the supporting surface defined on the carrier body and the front supporting surface defined on the clamping claw. The supporting surface defined on the carrier body, the front supporting surface defined on the clamping claw and the adjustment element define, therefore, a receiver and/or a seat for the cutting body in which the cutting body is statically determined and is supported in a positionally adjustable manner in a direction parallel to the supporting surface defined on the carrier body and the front supporting surface defined on the clamping claw.

In a preferred development, when axially supported on the front supporting surface defined on the clamping claw, the cutting body is additionally supported in a radially adjustable manner on the supporting surface defined on the carrier body. The additional support of the cutting body in a direction parallel to the supporting surface defined on the carrier body and the front supporting surface defined on the clamping claw is carried out preferably by a tapered screw held adjustably on the carrier body, which may be actuated from the front face of the tool. The fine adjustment in the radial direction by means of a tapered screw has proved advantageous.

The clamping claw is delimited from the carrier body preferably by an L-shaped slot extending axially parallel from the material joint. In this development, the clamping claw protrudes in the axial direction and the "joint axis" of the material joint is perpendicular to the rotational axis of the tool. Even with rotary tools with a cylindrical cross section, by machining a carrier body blank, for example, by means of a milling tool in two planes offset by 90° relative to one another an L-shaped slot may be produced in a simple manner, which delimits the clamping claw from the carrier body. In order to maintain a uniform flux of force in the carrier body over the cross-sectional surface of the clamping claw, the clamping claw, viewed in the axial direction, preferably has a substantially cuboidal cross section at least in the longitudinal portion adjacent to the material joint. The geometry of the clamping claw, as a result, may be maintained very easily.

A structurally simple and, in practice advantageous clamping of the clamping claw against the cutting body may be achieved by means of a clamping screw which is arranged in a through-bore in the clamping claw and screwed in the carrier body.

Preferably, the cutting body is configured as an elongate cutting insert, preferably an indexable cutting insert with diametrically opposing cutting edges, which has a recess along one longitudinal edge into which the front end portion of the clamping claw positively engages. The recess for technical production reasons is advantageously defined by two surfaces at right angles to one another. For the positive connection to the recess, the front end portion of the clamping claw which engages in the recess is of complementary shape. The positive engagement of the clamping claw in the cutting body ensures a clearly defined and stable support of the clamping claw on the cutting body whereby the mounting and resetting are simplified.

In the sense of a simplification of the production of the cutting body, the recess is formed continuously over the entire length of the cutting body, i.e. on both front faces of the cutting body. For mounting, the tool operator simply has to place the cutting body on the supporting surface defined on the carrier body, so that the clamping claw engages in the recess, and displace the cutting body sufficiently far in the direction parallel to the supporting surface defined on the carrier body and the front supporting surface defined on the clamping claw until the cutting body comes to bear against the additional supporting surface.

Preferably, the front end portion of the clamping claw engaging in the recess on the cutting body is dimensioned so that it engages in the recess in a planar manner, substantially over the entire length of the cutting body. The large surface area of the support of the clamping claw on the cutting body obtained thereby, results in a uniform transmission of the clamping force to the cutting body.

Due to the above-mentioned features, the cutting body, in particular an indexable cutting insert, is subjected to stress such that the cutting body bears against the clamping claw, on the one hand, and against the supporting surface on the carrier body, on the other hand, in each case over a large surface area. Contact stress may be minimized as a result, which is advantageous in particular when extremely hard cutting materials, such as for example hard metal, ceramic materials or cermet materials are used. Also the cutting body may be relieved of the clamping force applied thereto. Moreover, due to the planar contact of the cutting body both with the supporting surface on the carrier body and the front supporting surface on the clamping claw the extent to which the cutting body is subjected to stress when clamping the clamping claw may be easily controlled. Accordingly, the cutting body may already be pressed with sufficiently large force against the supporting surface on the carrier body before fine adjustment, for example, of the radial position of the cutting body is carried out.

It has been shown that the design according to the invention for clamping the cutting body is particularly advantageous when the tool is designed as a rotationally driven, rotary tool, for example a bore-finishing tool, such as a countersinking tool. In this case, the simplicity of the construction is particularly advantageous as the reduced constructional space also acts positively on the vibration behaviour of the tool. It is additionally advantageous that the extraction of waste material is only impaired to a small degree by the clamping structures of the cutting body, and namely only when the functional cutting edges of the cutting body lie on a small diameter. With rotationally driven, rotary tools, the clamping claw may protrude, for example, in a direction parallel to the material joint may be located perpendicular, for example radially, to the rotational axis. In this case, the front supporting surface of the clamping claw supports the cutting body in the axial direction of the tool. Alternatively, however, the clamping claw may protrude, for example, in a direction perpendicular to the rotational axis, for example in the radial direction and the "joint axis" of the material joint may extend parallel to the rotational axis. In this alternative case, the front supporting surface of the clamping claw supports the cutting body in a direction perpendicular to the rotational axis. With stationary tools, for example a turning tool, the clamping claw may protrude, for example, in the adjustment direction and the "joint axis" of the material joint may be aligned in a direction perpendicular to the direction of adjustment.

The tool according to the invention, therefore, is not intended to be restricted to a specific type of tool. The design set forth in the claims and evaluated above, for clamping a cutting body on a carrier body is instead—as far as this is technically possible—able to be transferred to different type of tool and tools for clamping cutting bodies supported in an axial and/or radial manner.

The invention is described hereinafter with reference to the example of a rotary tool, for example a countersinking tool, in which an indexable cutting insert is received in a seat on a carrier body which is radially aligned relative to the rotational axis and supported in the axial direction on an axially protruding clamping claw.

Figure 1:
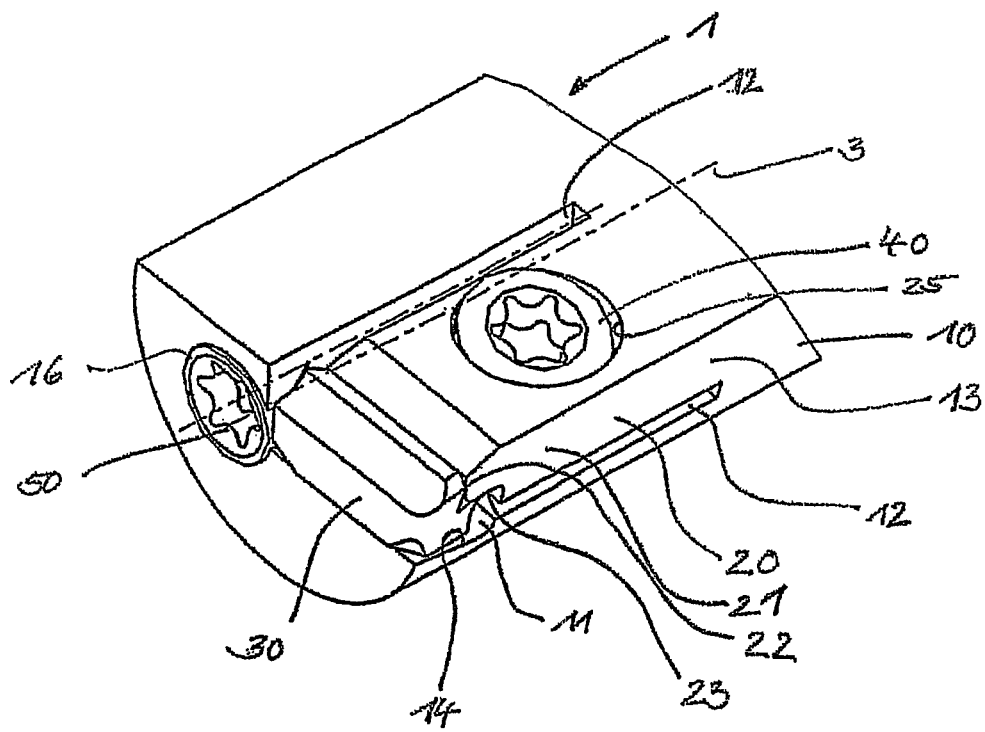
FIG. 1 shows a perspective view of a front cutting portion of a tool according to the invention.

FIG. 1 shows a tool 1 according to the invention in the form of a countersinking tool with a rotational axis 3. The tool 1 has a carrier body 10, a cutting body 30 arranged on the carrier body 10 in a detachable and positionally adjustable manner, a clamping claw 20 configured integrally with the carrier body 10 for fixing the cutting body 30 relative to the carrier body 10 in a positionally accurate manner, a clamping screw for clamping the clamping claw 20 against the cutting body 30 and an adjustment element 50 for adjusting the cutting body 30 in a direction perpendicular to the rotational axis 3. The carrier body 10 of the tool 1 has a conventional clamping shaft, not shown in the figures, for clamping the tool 1 in a suitable tool receiver.

Figure 2:
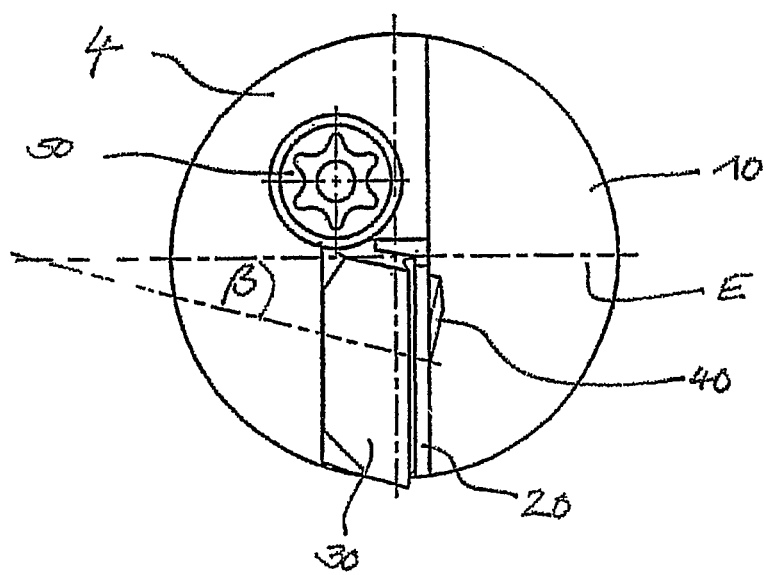
FIG. 2 shows an axial plan view of the cutting portion of the tool according to the invention of FIG. 1.

As visible from FIG. 2, the carrier body 10 is made from a cylindrical blank, which is flattened in an axially parallel manner in its front region as far as the front face of the tool 1.

In FIGS. 1 to 5, it may be seen that the carrier body 10 has an angular recess 11 which is accessible on the front and on the periphery, and in which the cutting body 30 is located, and also that the clamping claw 20 is configured integrally with the carrier body 10.

The clamping claw 20 configured integrally with the carrier body 10 is delimited from the carrier body 10 by a slot 12 which is L-shaped in cross section. The L-shaped slot 12 extends from a material joint 13 axially parallel in the direction of the tool front face. The clamping claw 20 which is delimited from the carrier body 10 by the L-shaped slot 12, therefore, protrudes in the axial direction. The L-shaped slot 12 may be produced, for example, by means of a milling tool by machining a carrier body blank in two planes offset relative to one another by 90°. The material joint 13 defines a "joint axis" perpendicular to the rotational axis 3, about which the clamping claw 20 may be pivoted relative to the carrier body 10 by elastic deformation of the material joint 13. Due to the aforementioned flattening of the carrier body 10, viewed in the axial direction the clamping claw 20 has a substantially cuboidal cross section almost over the entire length, but at least in the longitudinal portion forming the material joint 13.

At its protruding end portion 21, the clamping claw 20 has a front supporting surface 22 which supports the cutting body 30 in the direction of the material joint 13, i.e. in the axial and feed direction of the tool shown in the figures. The front supporting surface 22 stands perpendicular to the rotational axis 3 and extends parallel to the "joint axis" of the material joint 13. At right angles to the front supporting surface 22, the protruding end portion 21 also has an underside clamping surface 23 which bears against the cutting body 30 and transmits a clamping force in a direction of a bottom supporting surface 14 on the carrier body 10 forming the recess 11.

Figure 9:
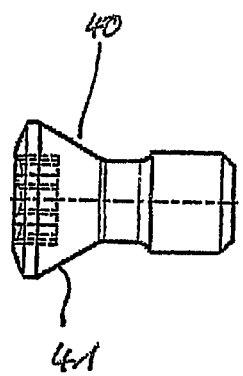
FIG. 9 shows a side view of a clamping screw of the tool according to the invention of FIG. 1.

For clamping the clamping claw 20 relative to the carrier body 20, a clamping screw 40 is provided which is received in a through-bore 25 in the clamping claw 20, and which is screwed in a corresponding threaded bore in the carrier body 20. The clamping screw 40 is shown in FIG. 9. For receiving the conical screw head of the clamping screw 40 which for example is provided with a hexagon socket recess, the through-bore 25 in a longitudinal portion which is located in the flattened portion of the carrier body 20 has a conical recess 26 against which a conical surface 41 of the clamping screw 40 bears.

As visible from FIG. 2, the rotational axis of the clamping screw 40—when viewed axially from the front face of the tool 1—is set at an acute angle β of, for example, 15° to a diametral plane E. The diametral plane E is at right angles to the front supporting surface 22 of the clamping claw 20 and the bottom supporting surface 14 on the carrier body 10. By means of the clamping screw 40, therefore, the clamping claw 20 may be clamped against the carrier body 20 with the interposition of the cutting body 30.

Figure 3:
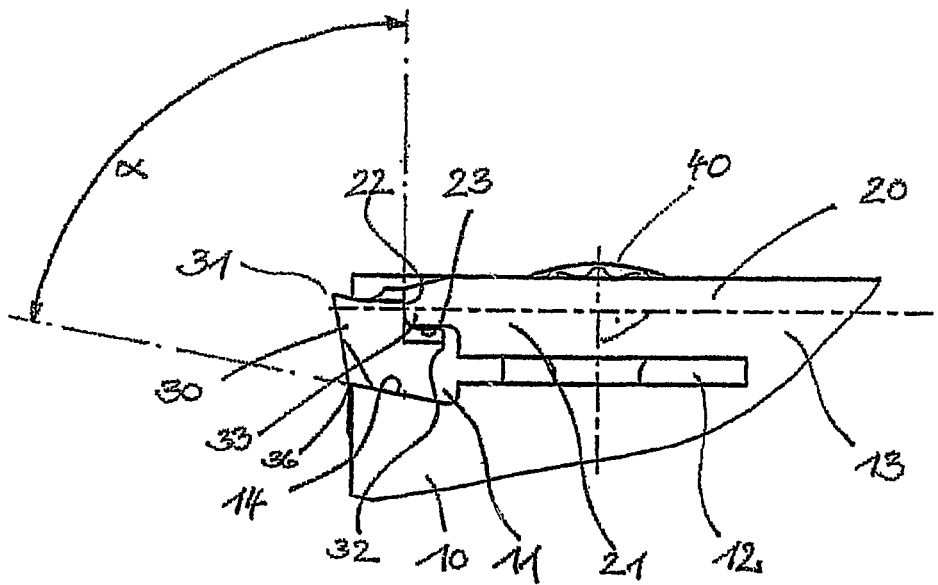
FIG. 3 shows a side view of a partial region of the cutting portion of the tool according to the invention of FIG. 1.
Figure 4:
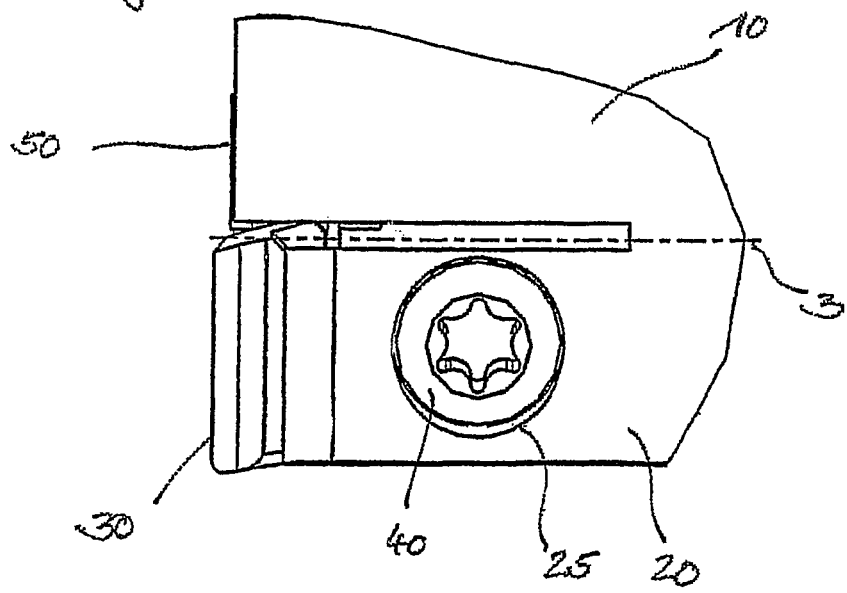
FIG. 4 shows a side view of the cutting portion of the tool according to the invention of FIG. 1 in an angular position rotated by 90° in comparison with FIG. 3, relative to the rotational axis of the tool according to the invention.
Figure 5:
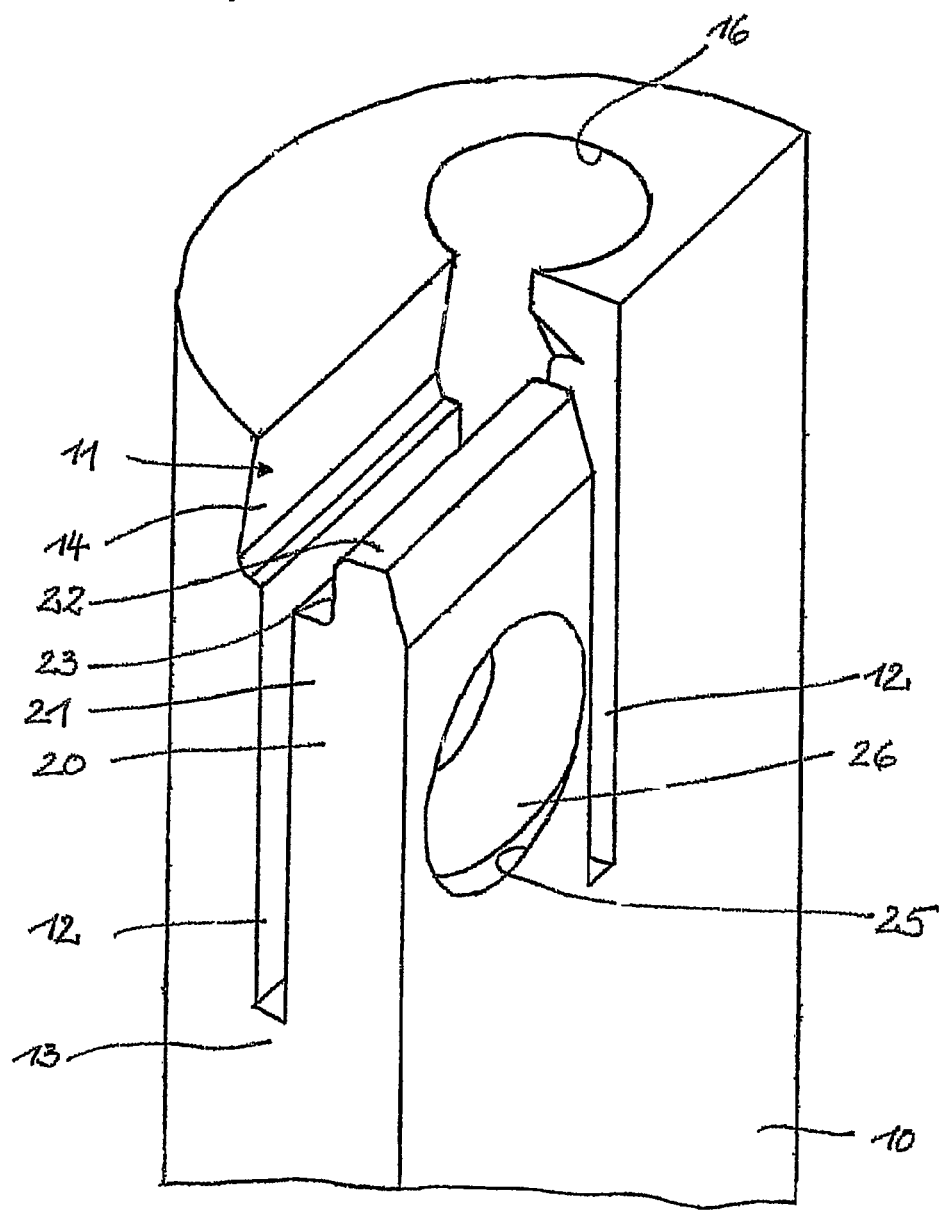
FIG. 5 shows a perspective view of a carrier body of the tool according to the invention of FIG. 1.
Figure 6:
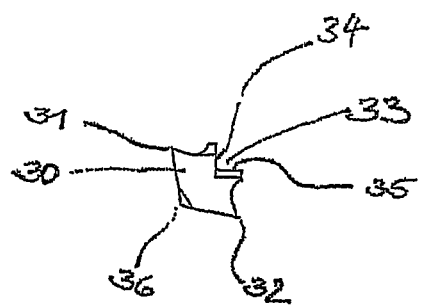
FIG. 6 shows a side view of a cutting body of the tool according to the invention of FIG. 1.

As visible from FIGS. 1 and 3, the front supporting surface 22 in the axial direction terminates at a predetermined distance from the front face of the tool, so that the main cutting edge 31 of the cutting body 30 protrudes by the required amount over the front face of the carrier body 20.

The cutting body 30 sits, as shown in FIGS. 1 and 3, in the recess 11 of the carrier body 10. At the bottom, the cutting body 30 is supported on the supporting surface 14, which is at an acute angle α of approximately 80° to the front supporting surface 22 and faces towards the material joint 13. Due to the acute angle α relative to the front supporting surface 22 on the clamping claw 20, the supporting surface 14 on the carrier body 10 facing the material joint 13, acts as a wedge surface along which the cutting body 30, when clamped against the supporting surface 14 on the carrier body 10, at the same time is subjected to a force component in a direction towards the material joint 13, in the tool shown in the figures in an axial direction and or counter to the feed direction.

Figure 8:
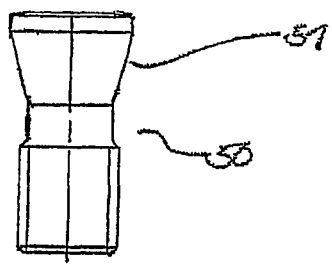
FIG. 8 shows a side view of a radial adjustment screw of the tool according to the invention of FIG. 1.

In a direction parallel to the supporting surface 14 defined on the carrier body 10 and the front supporting surface 22 defined on the clamping claw 20, the cutting body 30 located in the recess 11 bears against an adjustment element 50 in the form of a tapered screw 51 provided in the carrier body 10. The tapered screw 50, as shown in FIG. 8, has a conical surface 51, against which the cutting body 30 bears. As visible in FIG. 1, the tapered screw 50 is received in a threaded bore 16 in the carrier body 10 arranged eccentrically and extending axially parallel. The cutting body 30 is radially supported on the conical surface 51 of the tapered screw 50, so that it is radially adjustable by screwing the tapered screw 50 into the threaded bore 16.

By means of the supporting surface 14 defined on the carrier body 10, the front supporting surface 22 defined on the clamping claw 20 and the tapered screw 50, the position of the cutting body 30 relative to the carrier body 20 is thus fixed in the axial and radial directions.

Figure 7:
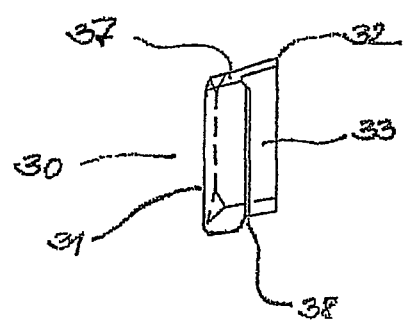
FIG. 7 shows a plan view of the cutting body of FIG. 6.

The cutting body 30 is provided as an elongate indexable cutting insert with two diametrically opposing cutting edges 31, 32, between which a recess is configured along one longitudinal edge, into which the front end portion of the clamping claw 20 positively engages. This is most clearly visible in FIGS. 1 and 3. The recess 33 corresponding to the front supporting surface 22 and the clamping surface 23 arranged at right angles thereto is defined by two surfaces 34, 35 located at right angles to one another, as visible in FIG. 7, and is configured continuously over the entire length of the indexable cutting insert 30.

Changing between the two main cutting edges 31, 32 of the indexable cutting insert 30 is brought about by the indexable cutting insert 30 (in an unmounted state) initially being rotated by 90° about the longitudinal axis and then additionally by 180° about an axis perpendicular thereto. When turning the indexable cutting insert 30, the longitudinal edge 36 opposing the recess 33 and the recess 33, therefore, always remain in the same position relative to the carrier body 20. According to the position of the indexable cutting insert 30, the axial support takes place on the front supporting surface 22 of the clamping claw 20 and the support of the clamping surface 30 on the cutting body side takes place, therefore, on one and/or the other of the two surfaces 34, 35.

The surfaces 34, 35 of the cutting body 30 forming the recess 33, in the direction of the material joint 13, i.e. in the tool shown in the figures, are dimensioned in the axial direction so that they are smaller by a predetermined amount than the underside clamping surface 23 of the clamping claw 20. As a result, it is ensured that in the mounted state of the clamping body 30 the clamping claw 20 only supports the cutting body 30 with its front supporting surface 22 in the axial direction.

FIG. 1 also shows that the front end portion 21 of the clamping claw 20 engaging in the recess 33 on the cutting body 30 is dimensioned in the radial direction so that it engages in the recess 33 in a planar manner, substantially over the entire length of the cutting body 30.

For mounting, the tool operator only has to place the cutting body 30 into the recess 11 defined on the carrier body 10, so that the clamping claw 20 engages in the recess 33, and displace said cutting body sufficiently far in the radial direction until the cutting body 30 bears against the conical surface 51 of the tapered screw 50.

For changing or turning the cutting body 30, initially the clamping screw 40 is loosened to such an extent that the cutting body 30 may be removed from the recess in the carrier body 10. Then the recess 11 is cleaned and either a new cutting body, or the old cutting body in the rotated state, is again inserted into the recess 11 and pushed in the radial direction against the tapered screw 50. In this state, the clamping screw 40 is tightened to such an extent that the cutting body 30 sits in the recess 11 of the carrier body 20 with minimal clamping. Then, by actuating the tapered screw 50 the cutting body 30 may be radially adjusted to the finished dimensions. Finally, the clamping screw 40 is tightened with the required torque.

In the tool 1 described above, the cutting forces are absorbed in the recess 11, whereby an extremely smooth operation results. The simple and stable clamping of the cutting body 30 between the clamping claw 20 and the carrier body 10 results in a long service life of the tool and excellent surface quality of the surfaces of the workpiece to be machined. The tool 1 according to the invention permits a simple adjustment of the radial position of the cutting body 30 in the slightly pretensioned state, whereby additional unproductive process times may be reduced. The subsequent tightening of the cutting body 30 does not lead to any significant alteration of the position of the cutting body 30 relative to the carrier body 10, resulting in uniform machining accuracy.

The invention has been described above with reference to the example of a rotary tool, for example a countersinking tool, in which an indexable cutting insert 30 is received in a recess 11 on the cutting body 20 aligned radially relative to the rotational axis 3, and is supported in the axial direction on the axially protruding clamping claw 20 and in the radial direction on the tapered screw 50.

The same advantages result, however, even when the clamping concept according to the invention is applied to different types of tool or tools, so that deviations from the above-described exemplary embodiment are possible without departing from the basic idea of the invention.

Thus the clamping concept according to the invention, as disclosed in the claims or in the introductory part of the description, is not restricted to the tool shown in the figures but as already explained in the introduction may be applied to different—rotary or stationary—tools for clamping cutting bodies which are supported axially and/or radially and/or in the tool feed direction/tool adjusting direction.

Instead of the L-shaped slot 12, the clamping claw 20 may also be delimited from the carrier body 10 in a different manner, for example by a differently shaped slot or material recess between the clamping claw 20 and the carrier body 10.

For the radial adjustment of the cutting body, instead of the axially adjustable tapered screw 50, for fine adjustment of the cutting body 30 in a direction parallel to the front supporting surface 22 of the clamping claw and the bottom supporting surface 14 on the carrier body, any other suitable adjustment elements or adjustment systems known from practice may be used for the fine adjustment.

Furthermore, the front supporting surface 22 on the clamping claw 20 does not have to extend parallel to the "joint axis" of the material joint 13—as in the exemplary embodiment described above—but may be aligned at an angle to the "joint axis" of the material joint 13 so that when the clamping claw 20 is clamped against the cutting body 30 said cutting body is not only subjected to a force component in the direction of the material joint 13 but at the same time to a force component in a direction parallel to the "joint axis" of the material joint 13, for example in a direction towards the rotational axis 3 of the tool 1. In other words, the front supporting surface 22 of the clamping claw 20 and the supporting surface 14 on the carrier body 10 may be arranged and aligned relative to one another and relative to the carrier body 10 so that the cutting body 30, when the clamping claw 20 is clamped, is subjected to the force component(s) suitable for the required positional accuracy.

Although a tool with just one cutting body has been described above, the clamping concept according to the invention is, in principle, also suitable for a tool with a plurality of cutting bodies. If a tool requires a plurality of cutting bodies, said cutting bodies may be clamped in each case by means of an associated clamping claw to a carrier body. The cutting bodies may in this case be arranged offset both in the peripheral and/or axial direction.

The invention, therefore, provides a tool, in particular a rotary tool for the machining, in particular for the material-removing machining, of workpieces in which a carrier body carries at least one cutting body, in particular an indexable cutting insert, in a positionally accurate manner. A clamping device is provided in the form of a clamping claw configured integrally with a carrier body, with which the cutting body may be fixed in a specific position relative to the carrier body, by the clamping claw pressing the cutting body in a planar manner against a supporting surface on the carrier body and the cutting body being supported on a front supporting surface of the clamping claw in the direction of a material joint connecting the clamping claw to the carrier body. Preferably, the cutting body arranged between the clamping claw and the carrier body is also arranged to be positionally adjustable relative to the carrier body in a direction parallel to the supporting surface on the carrier body and to the front supporting surface of the clamping claw and in the adjusted position may be fixed by the clamping claw.

The invention claimed is:

1. A tool for the machining of workpieces, the tool comprising:
   a carrier body,
   a cutting body detachably on the carrier body, and
   a clamping claw, the clamping claw fixing the cutting body relative to the carrier body, the cutting body being pressed against a supporting surface on the carrier body,
   the clamping claw integral with the carrier body via a material joint, and
   the cutting body supported on a front supporting surface of the clamping claw, the supporting surface located on the carrier body at an acute angle relative to the front supporting surface of the clamping claw, the supporting surface of the carrier body facing towards the material joint.

2. The tool according to claim 1, wherein the cutting body is arranged to be positionally adjustable in a direction parallel to the supporting surface on the carrier body and to the front supporting surface of the clamping claw.

3. The tool according to claim 1, wherein the front supporting surface of the clamping claw and the supporting surface on the carrier body extend parallel to a joint axis of the material joint.

4. The tool according to claim 3, wherein the tool further comprises an adjustment element which comprises a tapered screw with a conical peripheral against which the cutting body bears.

5. The tool according to claim 1, wherein the clamping claw is delimited from the carrier body by an L-shaped slot extending axially parallel from the material joint.

6. The tool according to claim 5, wherein the clamping claw, viewed in the axial direction, has a substantially cuboidal cross section.

7. The tool according to claim 1, wherein the tool further comprises a clamping screw which biases the clamping claw toward the cutting body, the clamping screw in a through-bore in the clamping claw and screwed into the carrier body.

8. The tool according to claim 1, wherein the cutting body has a recess along one longitudinal edge, into which the clamping claw extends.

9. The tool according to claim 8, wherein the recess is defined by two surfaces at right angles to one another.

10. The tool according to claim 8, wherein the recess extends over an entire length of the cutting body.

11. The tool according to claim 10, wherein the clamping claw extends over the recess in a plane, substantially over the entire length of the cutting body.

12. The tool according to claim 8, wherein the elongate cutting insert is an indexable cutting insert with diametrically opposing cutting edges.

13. The tool according to claim 5, wherein the tool extends longitudinally around a tool axis and the tool comprises a first longitudinal periphery, a first lateral periphery perpendicularly offset from the tool axis, and an opposing lateral periphery opposite the first lateral periphery in a plane extending through the tool axis, the L-shaped slot extending parallel to the tool axis from the material joint to the first longitudinal periphery and from the first lateral periphery only part way to the opposing lateral periphery.

14. The tool according to claim 5, wherein the L-shaped slot comprises a first leg and a second leg, the first leg extending substantially perpendicularly to the second leg, and wherein the first leg extends straight and the second leg extends straight.

15. The tool according to claim 5, wherein the tool further comprises an adjustment element adjacent to the L-shaped slot.

16. The tool according to claim 14, wherein the tool further comprises an adjustment element adjacent to the first leg and adjacent to the second leg.

* * * * *

UNITED STATES PATENT AND TRADEMARK OFFICE
CERTIFICATE OF CORRECTION

| | | |
|---|---|---|
| PATENT NO. | : 8,622,662 B2 | Page 1 of 1 |
| APPLICATION NO. | : 13/168380 | |
| DATED | : January 7, 2014 | |
| INVENTOR(S) | : Gerd Heckel et al. | |

It is certified that error appears in the above-identified patent and that said Letters Patent is hereby corrected as shown below:

Title Page, Item (56) Foreign Patent Documents

Please change: "RU 1704940 A1* 1/1992" to -- SU 1704940 A1* 1/1992 --

In the Specification

Col. 1, line 5

Please change: "machining. and" to -- machining, and --

Col. 1, line 10

Please change: "being," to -- being --

In the Claims

Col. 9, line 42

Please change: "body hears" to -- body bears --

Signed and Sealed this
Sixth Day of May, 2014

Michelle K. Lee
*Deputy Director of the United States Patent and Trademark Office*